Nov. 10, 1964  A. W. LINES  3,156,825
RADIO OPTICAL APPARATUS

Filed May 4, 1954  7 Sheets-Sheet 1

Inventor
Albert Walter Lines
By
Harry M. Saragovitz
Attorney

Nov. 10, 1964    A. W. LINES    3,156,825
RADIO OPTICAL APPARATUS
Filed May 4, 1954    7 Sheets-Sheet 4

Inventor
Albert Walter Lines
By Harry M. Saragovitz
Attorney

Nov. 10, 1964     A. W. LINES     3,156,825
RADIO OPTICAL APPARATUS Filed May 4, 1954     7 Sheets-Sheet 6

Inventor
Albert Walter Lines
By
Harry M. Saragovitz
Attorney

Nov. 10, 1964  A. W. LINES  3,156,825
RADIO OPTICAL APPARATUS
Filed May 4, 1954  7 Sheets-Sheet 7

Inventor
Albert Walter Lines
By
Harry M. Saragovitz
Attorney

United States Patent Office 3,156,825
Patented Nov. 10, 1964

3,156,825
RADIO OPTICAL APPARATUS
Albert Walter Lines, Great Malvern, England, assignor to the Minister of Supply in Her Majesty's Government of the United Kingdom of Great Britain and Northern Ireland, London, England
Filed May 4, 1954, Ser. No. 427,440
Claims priority, application Great Britain, May 4, 1953, 12,392/53
4 Claims. (Cl. 250—199)

This invention relates to electromagnetic wave apparatus.

The invention is concerned with such apparatus for use at wavelengths in the range between the infra-red part of the spectrum and the microwave part of the spectrum. The wavelengths in this range, conveniently referred to as quasi-optical, range between limits which cannot be exactly defined, but are of the order of 6 mm. down to say $\frac{1}{10}$ mm.

Radiations having wavelengths between these limits have been found difficult to work with because they are too long for the convenient application of the optical techniques appropriate to the infra-red part of the spectrum and similarly too short for the convenient use of techniques from the microwave part of the spectrum.

It is accordingly an object of this invention to provide apparatus for use at these quasi-optical wavelengths.

At the quasi-optical wavelengths the phenomenon of so-called total internal reflection can be arranged at a surface of a material capable of transmitting these wavelengths (e.g., acrylic materials, fused silica or polystyrene). The radiation field beyond the totally reflecting surface will decay exponentially from the surface. In this specification the term total internal reflection will relate to this phenomenon.

According to the invention an electromagnetic wave apparatus for use at quasi-optical wavelengths comprises first and second masses of dielectric material each for receiving electromagnetic wave radiation and redirecting it by total internal reflection at a surface defined by the mass the masses being positioned so that the aforesaid surfaces are spaced from each other in parallel relation to each other, whereby the spacing distance between the surfaces determines a desired transmission of radiation between them.

It is to be understood that such transmission refers to the transmission of radiation which under normal conditions (i.e., without the second spaced mass) would experience total internal reflection as ordinarily understood in optics.

This transmission between the surfaces depends, for a given spacing distance, upon the dielectric constants of the dielectric materials relative to that of the matter in the space between the surfaces.

Means may also be provided for adjusting the dielectric constant of the matter in the space between the surfaces.

Conveniently the first dielectric mass defines two surfaces for receiving and emitting the quasi totally reflected radiation, the surfaces being plane surfaces normal to the principal ray of a desired beam of totally reflected radiation.

Alternatively the first dielectric mass defines two surfaces of curved lens-shaped configuration for receiving and emitting the totally reflected radiation, the surfaces being so curved as to modify the phase of radiations in a desired beam of totally reflected radiation.

Matching means are preferably provided for those external surfaces of the dielectric, except of course the quasi totally reflecting surfaces, through which radiation passes between the dielectric mass and an external medium (generally air). Those means conveniently comprise quarter wavelength matching layers of dielectric constant $\epsilon$, where $\epsilon$ is the dielectric constant of the material of the dielectric mass. Alternatively, and particularly for curved external surfaces, quarter wavelength slots may be formed in the dielectric surfaces to provide matching means.

For use with plane external surfaces the matching layers may conveniently be formed on one surface of a plane plate of dielectric of the same material as the dielectric mass the plate being secured to the external surface or, where convenient, being made integrally with the dielectric mass; in this latter case the external surface as such does not of course continue to be identifiable.

Further the first dielectric mass comprises a first dielectric prism for performing total internal reflection and the second dielectric mass comprises a dielectric body having at least one plane surface, the dielectric body being positioned so that the one plane surface is spaced from the totally reflecting surface of the prism in parallel relation thereto, the spacing distance between the surfaces determining a desired transmission of radiation between the surfaces.

The dielectric body conveniently comprises a second dielectric prism for performing total internal reflection positioned so that its totally reflecting surface is adjacent the totally reflecting surface of the other, first prism. More conveniently the two prisms are right-angled prisms of isosceles cross-section (e.g., 45° prisms) whereby reciprocal transmitted and reflected radiation paths are obtained for radiation passing into or out of the prisms normally to the external (non-totally internal reflecting) surfaces.

In an arrangement using two right-angled prisms of isosceles cross-section a beam of radiation incident normally on any one of the external surfaces is divided into two beams in a prism, one which emerges in the same direction as the incident beam and a second which emerges at right angles to the incident beam. The ratio of the powers of these two beams is determined by the spacing between the opposing (quasi totally internal reflecting) surfaces of the two prisms and may be made to have any value between zero and infinity. Matching means are preferably provided for matching at external surfaces between the material of a prism and the external medium.

This invention is an application to the solution of problems arising in radio-optics of a principle already known in physical-optics wherein it is shown how a beam of light may be divided into two controllable components by the interaction field between two 45° prisms having their oblique surfaces close together. When the oblique optically polished surfaces of such prisms are placed in contact a beam of light will pass straight through without regard to the oblique surfaces. If the prisms are separated more than a few wavelengths, however, a light beam will not pass straight through but will be totally reflected at incidence internally on a 45° surface. If the separation of the prisms is adjusted to a clearance of the order of one or two wavelengths a normally totally reflected beam may be divided into two controllable components.

In works on physical optics it is shown that the processes of internal reflection are not limited entirely to actions within the dielectric medium, but the fields extend beyond the boundary surface a short distance into the space beyond. This phenomenon is shown in the experiment of Hall where Newton's rings are produced by a beam of light passing straight through a pair of 45° prisms having their oblique surfaces in contact at a central point, the surface of one prism being finished slightly spherical. The results show that the light wave fields extend beyond the limiting surfaces of the prisms into the interspace therebetween and excite light waves in the adjacent prism beyond the gap ("Physical Optics," Jenkins and White, pp. 410–411, FIG. 18U).

This phenomenon is found to apply to radio-optics in the wavelength band 6 mm. to $\frac{1}{10}$ mm. defined herein as quasi-optical wavelengths.

The invention utilizes, in part, the above described principle in the construction of a number of radio-optical devices useful in the art, where the controllable division of a beam into two or more components is desired. The application of this principle to the construction of a number of such devices which may be included as components in various kinds of radio-optical systems will now be outlined briefly and more in detail later.

A device herein identified as a "directive feed" will now be outlined. It comprises a pair of normally totally internal reflection prisms and means for feeding or coupling radiation into or out of each external prism surface. The spacing distance between the prisms in one case can be small so that the greater part of the radiation of a main beam entering the prisms leaves the prisms in the same direction as it enters. The remaining part of the main beam radiation is reflected and leaves the prisms at right angles to its original direction. Alternatively the spacing distance can be large so that the main beam radiation is reflected through a right-angle and only a small part is transmitted in the original direction. A greater bandwidth may be expected with this alternative arrangement.

Matching means may be provided for the prism external surfaces and will assist the reduction of unwanted coupling between the different directions in the directive feed.

A device herein identified as a "hybrid unit" comprises a "directive feed" in which the spacing distance between the prisms is adjusted to give division of an incident beam into two equal beams.

A device defined herein an "absorption wavemeter" includes a pair of prisms arranged to give almost maximum transmission of radiation in a given direction. One of the normally totally reflecting surfaces is then arranged to reflect the remaining small part of the radiation to an interferometer of the Fabry-Pérot type; a suitable detector receives energy reflected from the interferometer through the two prisms in a direction orthogonally to the given direction. Low and high Q-value wavemeters in series can be provided by the use of low and high reflectivity reflectors in series in the interferometer.

A device herein defined a "standing wave indicator" comprises two prisms arranged to give almost maximum transmission of radiation in a given direction. One of the totally reflecting surfaces then reflects the remaining small part of the radiation at right angles. An adjustable mirror is arranged to reflect this part back through the two prisms, at right angles to the given direction, to a detector.

A device herein defined a "matching unit" comprises a hybrid unit combined with adjustable mirrors arranged to reflect back into the prisms the reflected (at a normally totally-reflecting surface) and transmitted (across the totally reflecting surfaces) beams due to a given incident beam. By adjustment of the mirrors compensation is obtained for a mismatch in the incident side of the given incident beam. The emergent beam is at right angles to the incident beam.

A modification of the "matching unit" described above may be made by providing a third prism to restore the direction of the emergent beam to that of the incident beam.

A device herein defined a "balanced mixer" comprises a hybrid unit, a signal source for feeding into the hybrid unit, a first mixer for receiving a quasi totally internal reflected signal beam from the hybrid unit, a second mixer for receiving a transmitted (i.e., the complementary non-totally internal reflected) signal beam from the hybrid unit, and a local oscillator for feeding the hybrid unit in a direction at right angles to and uncoupled to the signal source feed whereby the resultant signals at the two mixers differ in phase by $\lambda/2$.

A TR (transmit-receive) device according to this invention comprises a first hybrid unit dividing an incident beam derived from a local oscillator source into two beams, a second hybrid unit for dividing one of the two beams for feeding two balanced signal mixers and a third hybrid unit for dividing the second of the two beams for feeding two balanced A.F.C. (automatic frequency control) mixers, the second hybrid unit also dividing a signal beam into two beams for feeding two signal mixers and the third hybrid unit dividing a beam derived from a source of A.F.C. reference frequency into two beams for feeding the two A.F.C. mixers.

Conveniently the hybrid units and a further pair of prisms form a square, the adjacent surfaces of the further pair of prisms being arranged as back-to-back plane reflecting surfaces having no transmission between them and together with the totally-reflecting surfaces of the first hybrid unit aligned along one diagonal of the square.

In one construction the hybrid units and the further pair of prisms are made integrally with one another thereby eliminating those of their external surfaces which oppose each other.

Several embodiments of the invention will now be described by way of example reference being made to the accompanying drawings in which.

Figure 1:
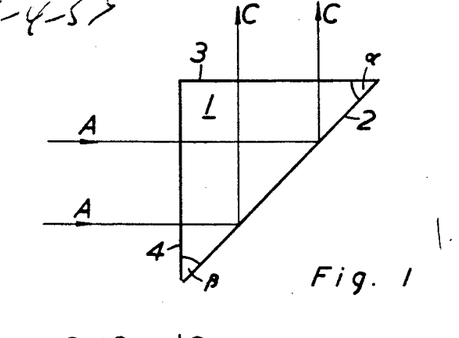
FIG. 1 shows a plan view of a so-called totally internal reflecting prism.

In FIG. 1 a right-angled prism 1 made of a polystyrene is arranged to provide so-called "total" reflection at its surface 2 for radiation of quasi-optical wavelengths incident or emergent normally to each of the surfaces 3 and 4. The angles $\alpha$ and $\beta$ of the prism 1 are equal.

An incident beam of radiation AA is transmitted without refraction at the surface 4 and is "totally" reflected at the surface 2 to emerge without refraction from the surface 3 as a beam CC. The beam CC is then proceeding orthogonally to the original direction of beam AA. As described above the radiation field accompanying internal reflection extends outwardly beyond the totally reflecting surface 2 into space where it decays exponentially in a distance of several wavelengths.

Figure 2:
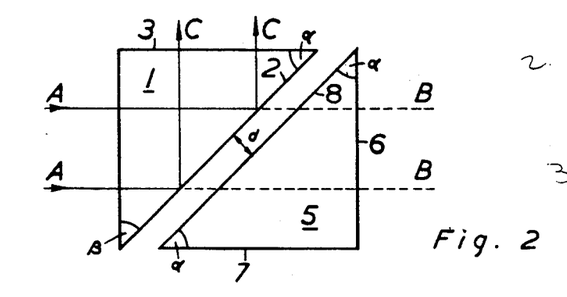
FIG. 2 shows an arrangement using a pair of the totally internal reflecting prisms of FIG. 1, FIG. 2a and FIG. 2b show curves relating to the reflection and transmission characteristics of typical prism pairs.

Referring now to FIG. 2 the arrangement shows a further prism 5 added to the arrangement of FIG. 1. The totally internal reflecting surface 8 of the prism 5 is uniformly spaced a distance $d$ from the surface 2 of the prism 1. The incident beam AA is transmitted orthogonally by reflection at the surface 2 to give an emergent beam CC. When surfaces 2 and 8 are sufficiently close the radiation field, as described above, extends across the gap "$d$" into prism 5 where it is transmitted without reflection or refraction at surface 8 as emergent beam BB. The ratio of the power in the beam CC to the power in the beam BB is determined by the spacing distance $d$ between the surfaces 2 and 8 and may be in the range between zero and infinity. The actual value of this ratio depends, for given prisms and spacing, upon the direction of the plane of polarisation of the incident radiation.

Figure 2A:
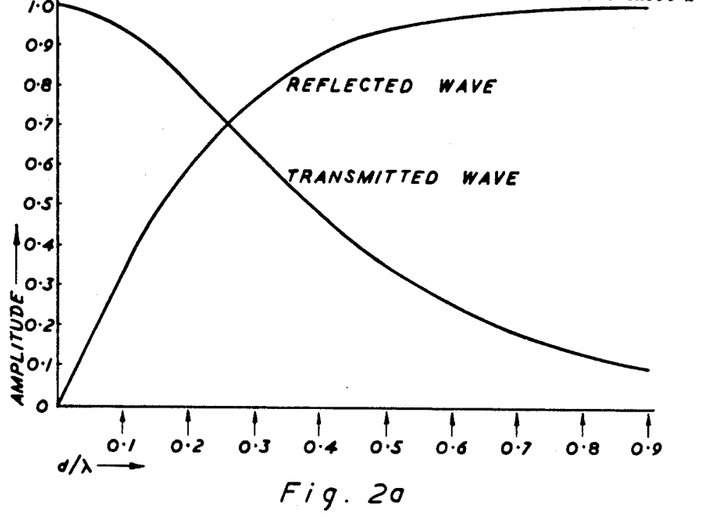

FIG. 2a shows, for two distrene prisms ($\alpha = \beta = 45°$), the amplitudes of the reflected and transmitted radiation waves for different ratios of spacing distance to wavelength.

Figure 2B:
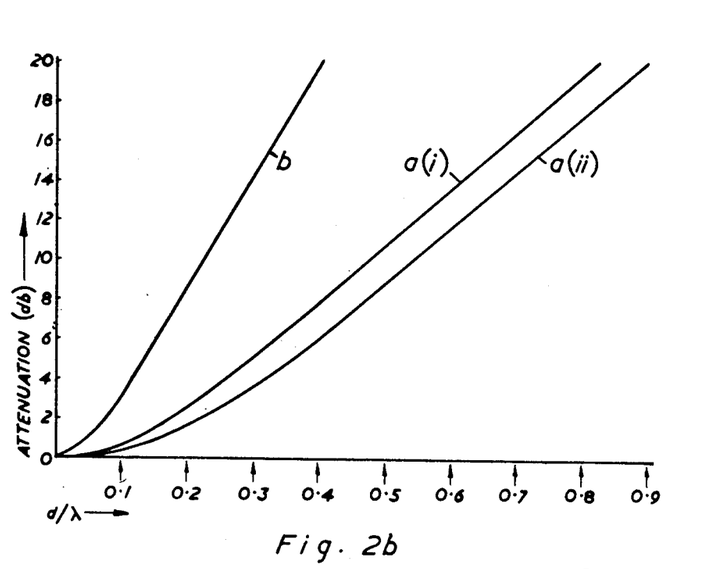

FIG. 2b shows the curves of attenuation of the transmitted radiation wave plotted against the ratio of spacing distance $d$ to wavelength $\lambda$:

(a) for a pair of distrene prisms ($\alpha = \beta = 45°$)
   (i) where the electric vector is perpendicular to the plane of incidence of the radiation
   (ii) where the electric vector is parallel to the plane of incidence of the radiation, and
(b) for a pair of fused quartz prisms ($\alpha = \beta = 45°$) where the electric vector is parallel to the plane of incidence of the radiation.

Any suitable means may be adopted for adjusting the spacing distance between the prisms 1 and 5.

Figure 3:
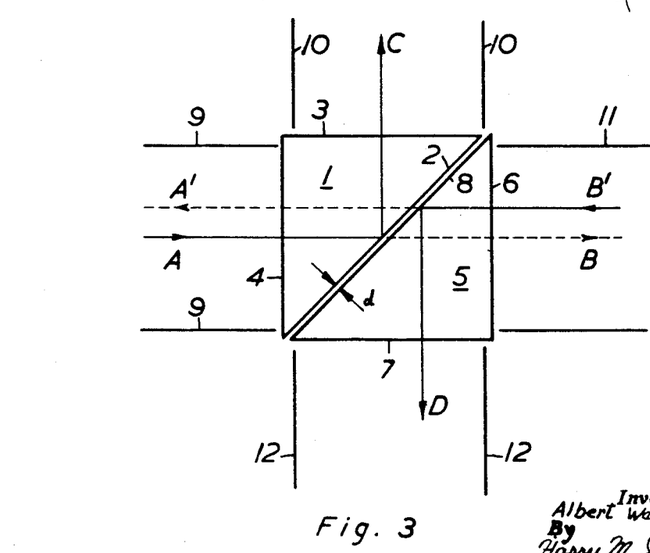
FIG. 3 shows a directive feed.

FIG. 3 shows a "directive feed" in which a pair of prisms 1 and 5 is arranged to give a desired division of a main incident beam A into a reflected beam C and a transmitted straight through beam B. The power in beam B is arranged to be substantially greater than the power in beam C ($d$ is small).

The main beam A is fed to the surface 4 by means of a tube 9 and beams C and B feed into tubes 10 and 11 respectively. These tubes are conveniently made of conducting material and are useful where unwanted couplings and interfering radiation must be reduced. Their cross-sectional dimensions are large compared with the wavelength of the transmitted radiation. In the present case for a typical frequency of 80 kmc./s. ($\lambda = 3.75$ mm.) a tube of approximately 60 mm. square was used.

In this arrangement, by symmetry, a beam B' incident on the surface 6 of the prism 5 will be divided into a straight-through beam A' and a reflected beam D. The beam D feeds into a conducting tube 12.

Coupling between the beams A and D and the beams B and C, is reduced for efficient transfer, by forming slots a quarter wave length deep in surfaces 3, 4, 6 and 7. Alternatively a "bloom" analogous to an optical bloom may be used comprising a quarter wavelength layer of dielectric constant $\sqrt{\epsilon}$ where $\epsilon$ is the dielectric constant of the prism material. An example of this is quarter wavelength skins of P.T.F.E. (polytetrafluorethylene) upon the surface of a fused quartz prism.

The problem of matching impedance at abrupt discontinuities occurring at prism surfaces arises in the transmission of quasi-optical frequencies just as it does in transmission in the centimeter band and in transmission lines at all frequencies, and requires special techniques to avoid reflection losses at such discontinuities. A number of alternative means have been found applicable to conditions arising in the quasi-optical band which will be described more fully later.

Figure 4:
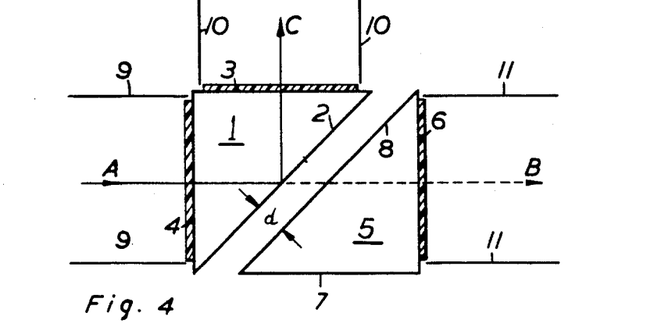
FIG. 4 shows another directive feed.

FIG. 4 shows a "directive feed" in which the main power (in beam A) is turned through a right angle (into beam C). A wider bandwidth should be obtained with this arrangement. Reflection losses at discontinuities may be reduced in this case by matching into the surfaces 3, 4 and 6 from the external transmitting medium in the tubes 9, 10 and 11 to the characteristic impedance of the prism dielectric material.

The device of FIG. 4 may be modified according to the invention to provide a "variable attenuator" for the straight through radiation beam A–B. This may be accomplished in the manner shown schematically in FIG. 4a where micrometer means indicated generally at 80 is provided to move prism 5 laterally, thereby to adjust the gap "$d$" between the two prisms and control the intensity of beam B. The intensity of B may be adjusted from zero, when "$d$" is several wavelengths, to full equality with source beam A when clearance "$d$" is reduced to zero.

Figures 4A, 9:
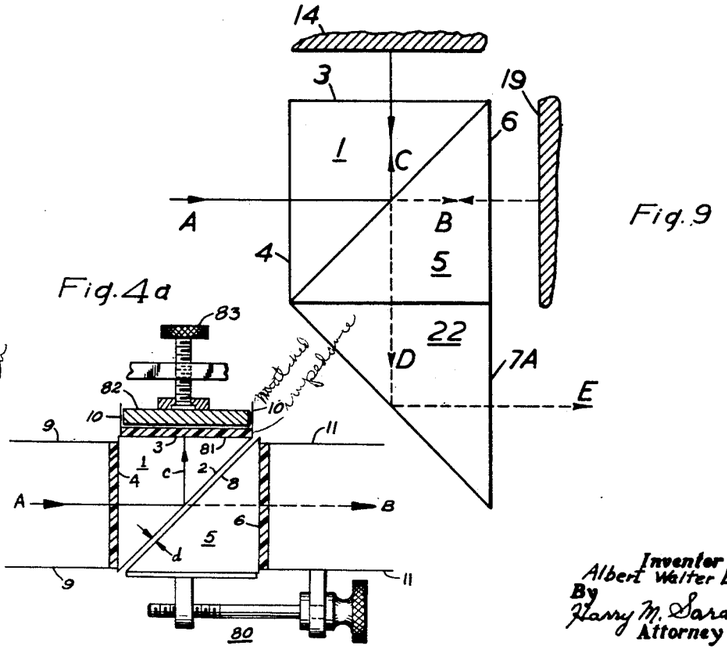
FIG. 9 shows another matching unit.

In order to avoid standing waves along the path of beam A for varying adjustments of "$d$" it is desirable to completely absorb the varying energy of beam C. This may be accomplished by placing a matched load 81 on prism surface 3 which may consist of a layer of suitable dielectric material (as stated above) and having a thickness of a quarter wavelength of the radiation. In order to make the matched load accurately adjustable over a wide band of frequencies a metallic reflector 82 is fitted slidably in tube 10 and attached adjustably to the end of micrometer screw 83 as shown.

Figure 5:
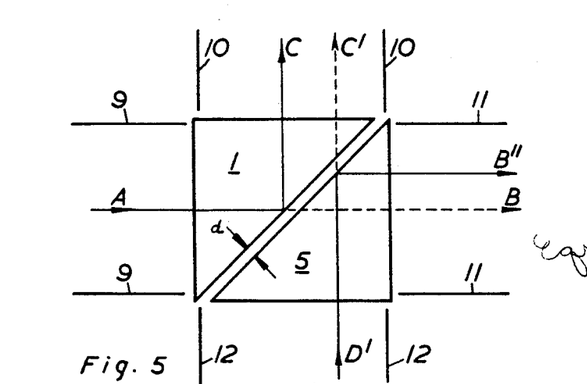
FIG. 5 shows a hybrid unit.

FIG. 5 shows a "hybrid unit". A pair of prisms 1, 5 is so arranged for an incident beam A that the reflected and transmitted powers in the beams C and B respectively are *equal*. The reflected and transmitted powers in beams B'' and C' are also equal; these beams are derived from an incident beam D'.

The resultant beams $C+C'$ and $B+B''$ are thus each derived from beams A and D' by equal division of these beams and subsequent addition of appropriate divided parts in the hybrid unit.

Figure 6:
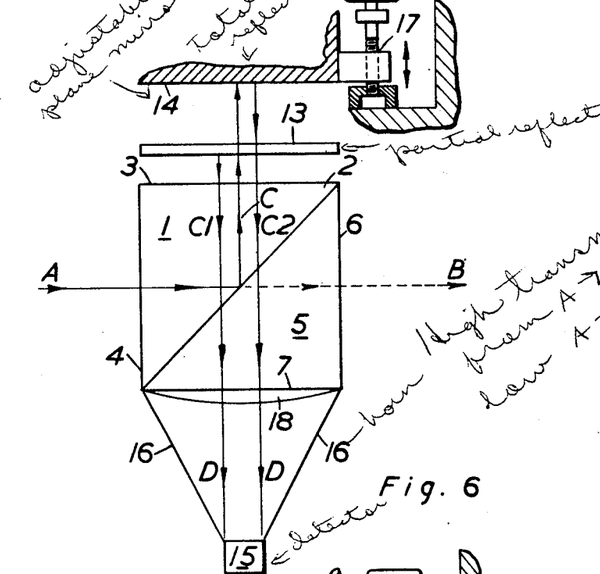
FIG. 6 shows an absorption wavemeter.

In FIG. 6 a "directive feed" comprising a pair of prisms 1 and 5 may be modified to provide an "absorption wavemeter". In this case the spacing distance between the prisms 1 and 5 is arranged to give a high transmission from the beam A to the beam B and only a small amount of power is directed along the beam C. In this figure as in other figures the total reflecting faces 2 and 8 are so close together that they are shown an unspaced for convenience of drawing.

The "directive feed" feeds this small amount of power into a Fabry-Pérot interferometer of the reflection type comprising a partial reflector 13 and an adjustable plane mirror 14 (i.e., a complete reflector with no transmission), in the path of the reflected beam C; a detector 15 is fed from a horn 16 from the surface 7 of the prism 5. The detector 15 comprises a crystal detector of the type developed by Ditchfield, British Patent No. 689,179. The horn 16 is designed to match the feed from the prism 5 into the crystal detector. A micrometer screw device 17 enables the plane mirror 14 to be moved in the direction of the beam C.

In use a small proportion of the power in the beam A is directed by the directive feed in the direction C to the Fabry-Pérot interferometer. The radiation reflected from the Fabry-Pérot interferometer is therefore transmitted by the prisms 1 and 5 to the detector 15 via the horn 16. The direction of beam C1 is a direction such that a negligible amount of power is reflected at the surface 2 and hence fed-back against the main incident beam A. Due to dispersion, portions of the beam travelling near or along the walls of horn 16 may be delayed appreciably with respect to the more direct portions in reaching detector 15. This delay produces a phase difference which may be reduced or corrected by a focusing element 18 at the surface 7 of prism 5.

Measurement of wavelength is performed by adjustment of the micrometer screw device 17 to obtain positions of the mirror 14 which give minimum signals in the detector 15. The difference of the readings corresponding to successive minimum signal positions of the mirror 14 represents the wavelength of the radiation of beam A.

The Q value of the wavemeter is a function of the reflectivity of the interferometer reflector. When the reflectivity is approximately 50% in power the wavemeter is matched.

Figure 7:
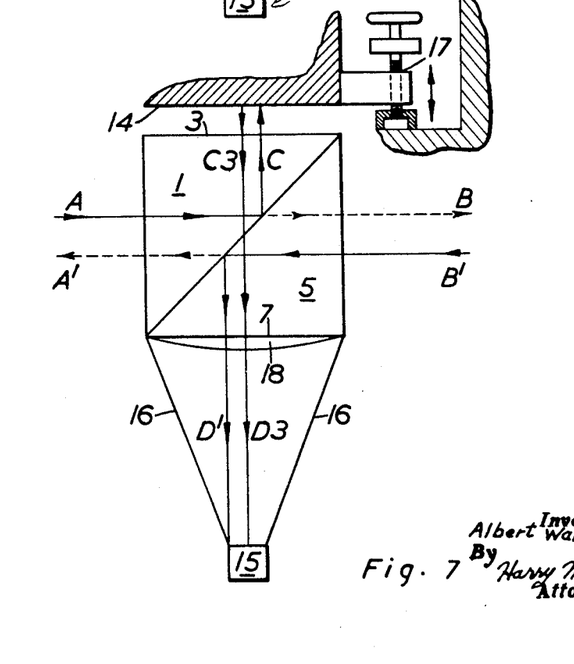
FIG. 7 shows a standing wave indicator.

In FIG. 7 a directive feed comprising prisms 1 and 5 is used in providing a "standing wave indicator." The beams AB and B'A' represent two waves travelling in opposite directions whose interference produces a standing wave. These beams AB and B'A' are transmitted straight through the prisms 1 and 5. The prism spacing is such that a small part of beams AB and B'A' are reflected in the directions C and D' respectively. The part of beam AB reflected in the direction C is reflected back again as shown at C3 from a mirror 14. The mirror 14 is adjustable backwards or forwards in the C direction by means of a micrometer screw 17.

The reflected beam C3 is transmitted through the prisms 1 and 5 and proceeds through a horn 16 to a detector 15. A phase correcting lens 18 is provided at the face 7 of the prism 5. The part of beam B'A' reflected in the direction D' proceeds to the detector 15 through the horn 16. The two reflections into the detector 15 are both reduced in the same ratio relative to the beams from which they are derived by reflection.

The signals in the detector 15 due to the beams AB and B'A' will form a resultant whose value will depend upon the amplitudes and relative phases in the beams D' and D3. The mirror 14 can be adjusted so that the signals will be in antiphase and the resultant will fall to a minimum; also so that the signals will assist each other to give a maximum resultant.

The standing wave ratio is determined from the ratio of the maximum and minimum values of the signals in the detector 15. This determination thereafter follows known transmission line theory and need not therefore be elaborated here.

Moreover, because the phase of the reflection at any position of the mirror 14 can be determined the effective mismatch impedance at any plane front along the beams BB' can be calculated.

A standing wave indicator of this form has the advantage that it samples the energy over the cross-section of the beam. This insures that the standing wave ratio obtained is an average value over the beam wavefront.

Additionally an indicator of this form, because there are no discontinuities such as a probe would produce, is not likely to break down, particularly at the low energy densities employed.

Surface matching between the prisms 1 and 5 and the external transmission medium is required and consists of quarter wavelength matching layers of dielectric constant $\sqrt{\epsilon}$, where $\epsilon$ is the dielectric constant of the prism material. Quarter wavelength slots in the surfaces 3, 4, 6 and 7 may be used alternatively.

Figure 8:
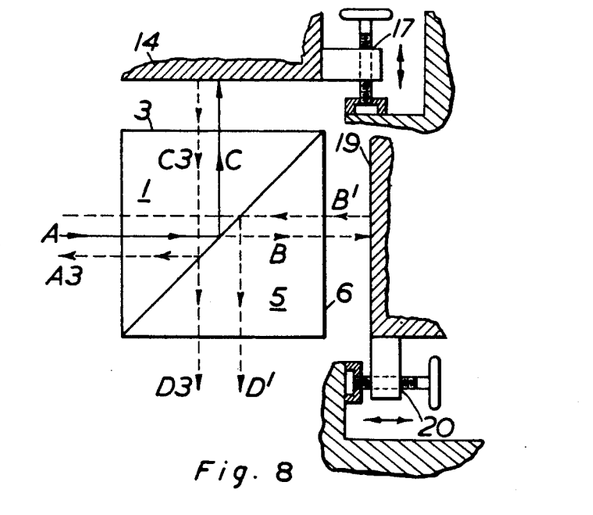
FIG. 8 shows a transmission matching unit.

A "transmission matching unit" is shown in FIG. 8. This embodies the hybrid unit of FIG. 5, with a first adjustable mirror 14 opposite the surface 3 of the prism 1 and a second adjustable mirror 19 opposite the surface 6 of the prism 5. The mirrors 14 and 19 are controlled by micrometer screws 17 and 20 respectively. The arrangement is such that the main energy flow in the direction A is reflected through a right angle. By adjustment of the mirrors 14 and 19 the values of amplitude and phase of a reflected wave may be adjusted to a suitable value to compensate for any mismatch produced along the main beam of energy.

Where it is desirable that the main energy flow should emerge from the unit in the same direction as it enters the arrangement of FIG. 9 is used. Here a third prism 22 is provided to turn the main energy flow A through a right angle for the second time so as to restore it to the original direction at E.

Surface matching of the type described above is provided at the surfaces 3, 4, 6 and 7A.

Figure 10:
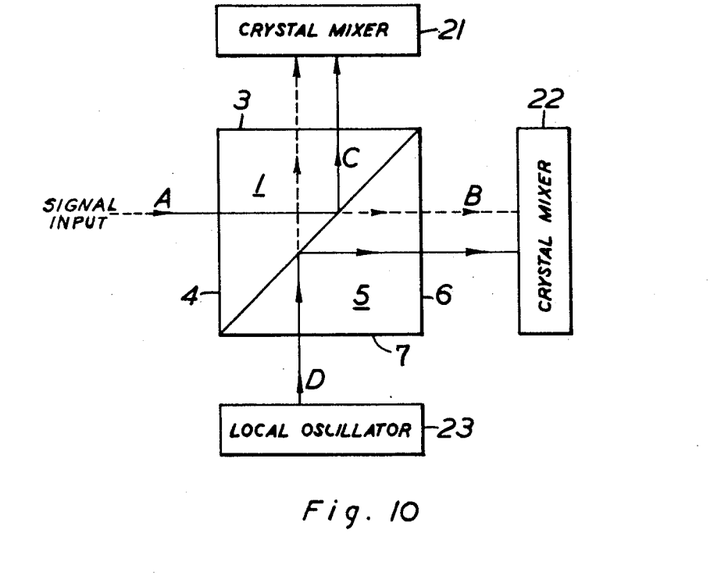
FIG. 10 shows a balanced mixer.

A "balanced mixer" is shown in FIG. 10. A pair of prisms 1 and 5 arranged as a hybrid unit are fed at the surface 4 from a signal source (not shown) and at the surface 7 by a local oscillator 23 (which could be either a klystron or magnetron type). At surfaces 3 and 6 the hybrid unit feeds into the crystal mixers 21 and 22 respectively. The crystal mixers 21 and 22 respectively each receive therefore both a signal oscillation and a local oscillation along the directions C and B.

This arrangement gives cancellation of local oscillator noise due to the phase difference of $\pi$ radians which exists between the inputs to the two mixers 21 and 22.

In the hybrid unit shown let X be the phase change produced when reflection takes place at one of the totally reflecting surfaces and Y be the phase change produced when transmission takes place through the totally reflecting surfaces.

Then, if $\theta$ and $\phi$ are the respective phases of reflected and transmitted waves, by the Theorem and Reciprocity:

$\theta + X = \phi + Y$ waves in phase
$\theta + Y = \pi + \phi + X$ waves in antiphase Therefore $Y - X = \pi/2$ That is, a phase difference of $\pi/2$ between the reflected and transmitted waves.

If, now a local oscillation $1 = L \sin(wt + \psi)$ and a signal oscillation $s = S \sin(w + \Omega)t$ are fed into the hybrid the following resultants are obtained.

At crystal mixer 21:

$S \sin[(w+\Omega)t + \phi + \pi/2] + L \sin(wt + \psi)$

At crystal mixer 22:

$S \sin[(w+\Omega)t + \phi] + L \sin(wt + \psi + \pi/2)$

The resultant at mixer 21 is a minimum when $(w+\Omega)t + \phi + \pi/2 = wt + \psi + \pi + 2n\pi$ i.e. when $\Omega t = \psi - \phi + \pi/2 + 2n\pi$ The resultant a mixer 22 is a minimum when $(w+\Omega)t + \phi = wt + \psi + \pi/2 + \pi + 2n\pi$ i.e. when $\Omega t = \psi - \phi + 3\pi/2 + 2n\pi$ These resultants differ in phase by $\pi$ and hence cancellation of local oscillator noise will occur.

Figure 11:
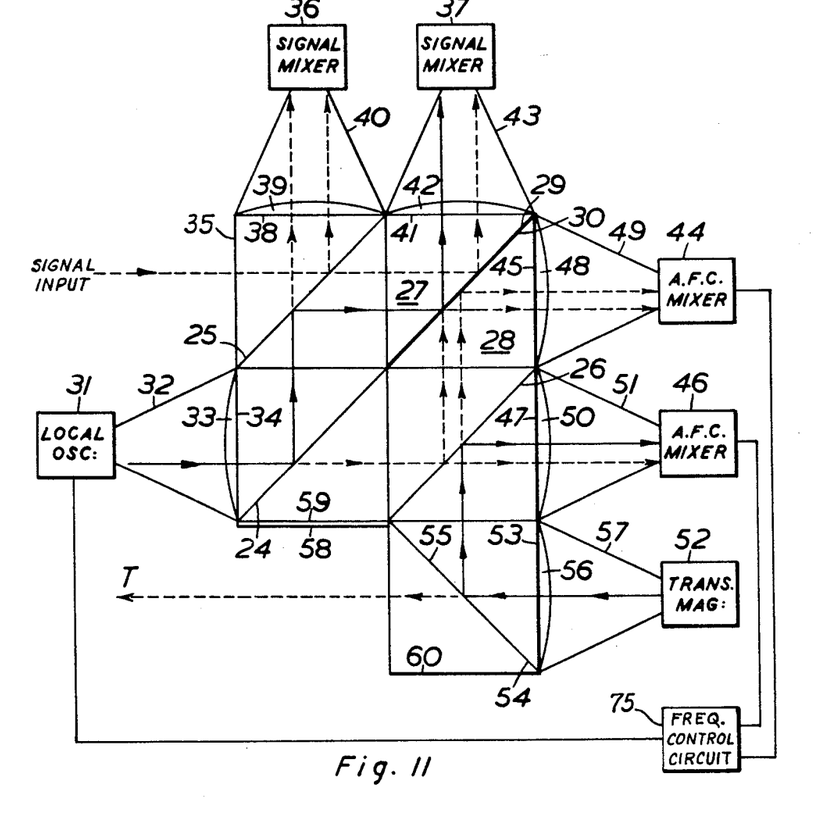
FIG. 11 shows a TR (transmit-receive) unit.

FIG. 11 shows an arrangement for a TR (transmit-receiver) unit based on an assembly of hybrid units. Three two-prism hybrid units 24, 25 and 26 are arranged in L formation. A pair of prisms 27 and 28 are placed in the corner of the L to complete a square. The reflecting surfaces of the hybrid units 24, 25 and 26 are mutually parallel; the prisms 27 and 28 have surfaces 29 and 30 respectively comprising plane mirrors which reflect back into the prisms. There is therefore no transmission across the surfaces 29 and 30. The reflecting surfaces of the hybrid unit 24 and the surfaces 29 and 30 lie along the same diagonal of the square formed by the prisms 29 and 30 and the hybrid units 24, 25 and 26.

A local oscillator 31 (which could be either a klytron or magnetron type) feeds into a surface 34 of the hybrid unit 24 by means of a horn 32. A phase correcting lens 33 is provided on the surface 34.

A signal oscillation feeds into a surface 35 of the unit 25; a signal mixer 36 is fed from another surface 38 of the unit 25 via a phase correcting lens 39 and a horn 40 and a second signal mixer 37 is fed from a surface 41 of the prism 27 via a phase correcting lens 42 and a horn 43. Mixers 36 and 37 are thus arranged as balanced signal mixers.

An A.F.C. (automatic frequency control) mixer 44 is fed from a surface 45 of the prism 28 and a second A.F.C. mixer 46 is fed from a surface 47 of the unit 26. The output of balanced A.F.C. mixers 45 and 46 is fed to a frequency of local oscillator 31. A phase-correcting lens and horn combination 48, 49 is associated with the mixer 44 and a second, similar combination 50, 51 is associated the mixer 46.

A transmitter magnetron 52 is arranged to feed a reference signal for A.F.C. purposes into a surface 53 of the unit 26 by means of a two prism directive feed 54. The main part of the radiation of the transmitter magnetron 52 is transmitted unreflected through the unit 54 in the direction T whilst the reference signal is reflected at the surface 55 into the hybrid unit 26. A phase-correcting lens and horn combination 56, 57 couple the transmitter magnetron 52 to the directive feed 54.

A matched load 58 is provided at a surface 59 of the hybrid unit 24.

In operation the local oscillation divides equally in the hybrid unit 24 and each resulting part divides equally in the hybrid units 25 and 26. The local oscillation is then in four equal parts each of which feeds into a different one of the four mixers 36 and 37 (signal), 44 and 46 (A.F.C.), either directly or after reflection at the plane mirrors 29 or 30.

The signal oscillation is divided equally in hybrid unit 25 and proceeds to the signal mixer 36 directly and to the signal mixer 37 after reflection at the plane mirror 29.

The A.F.C. reference oscillation from the transmitter magnetron 52 is directed to the hybrid unit 26 by the directive feed 54. It divides in that unit, one part then being reflected to feed the A.F.C. mixer 46, and the other part being transmitted into the prism 28 and, after reflection at the plane mirror 30, into the A.F.C. mixer 44.

An alternative arrangement of the directive feed 54 can be made in which the transmitter magnetron 52 feeds into a face 60 of the directive feed 54. The directive feed 54 is then arranged to give fractional transmission from the magnetron 52 into the hybrid unit 26 and to reflect the main part of the power from the magnetron 52 through a right angle.

Figure 12:
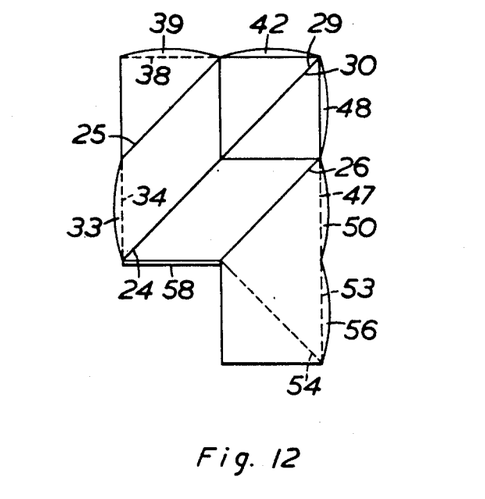
FIG. 12 shows a component for use in the TR arrangement of FIG. 11.

A simplified construction for a TR unit is shown in FIG. 12. It represents a so-called "preplumbed" construction. The common surfaces of the hybrid units 24, 25 and 26 and the directive feed 54 are eliminated by integral construction of these units. The common surfaces are not required because transmission across them is always at right angles to the surfaces. Similarly the common surfaces of the lenses 33, 39, 50 and 56 and their associated units 24, 25, 26 and 54 are eliminated. A further modification would be the elimination of the surfaces between the prisms 27 and 28 and their associated hybrid units 25 and 26 respectively.

Figure 13:
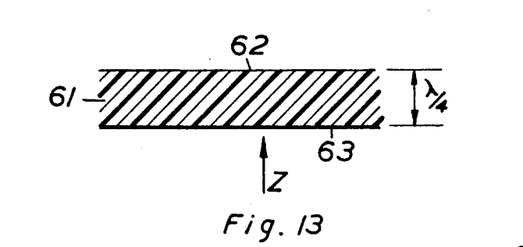
FIG. 13 shows a matched load.

The matched load 58 used in the TR unit of FIG. 11 is shown in FIG. 13 and consists of a dielectric plate 61 which is a quarter wavelength (λ/4) thick (the wavelength λ being measured in the material of which the dielectric plate is made). One surface 62 of the plate 61 is metallised completely so that radiation in the direction Z will be entirely reflected; a second surface 63 of the plate is partially metallised so that its impedance is equal to that of free space ($\sqrt{\mu/\epsilon}=377$ ohms). For radiation of wavelength λ travelling in the direction Z the device constitutes a matched load.

In an alternative construction the dielectric 61 is air and the surface 63 is formed by a convenient dielectric (e.g., the surface 59 of the hybrid 24 of FIG. 11). A mirror, adjustable in distance from the surface 63, replaces the surface 62.

The distance of the mirror from the partially metallised surface 63 is adjusted to relate the dimension λ/4 to the radiation to which it is desired to tune.

An alternative matched load comprises a length of lossy dielectric arranged for feeding at one end. The feeding end is matched by a quarter wavelength plate attached to it. The length of the dielectric is determined according to the penetration into the load.

A modification of this alternative matched load enables it to be used as a fixed attenuator or pad. The modification comprises attaching a second quarter wavelength plate to its other end.

In all the embodiments described above it is advantageous to match those surfaces through which radiation passes from air to dielectric or vice versa. Such matching, sometimes referred to as surface matching, reduces unwanted reflections at the discontinuities produced by these surfaces and its use with some apparatus for example the wavemeter or the interferometer is most desirable.

For reasons of convenience however apparatus such as the wavemeter will often be made without this matching; it is not always possible to tell whether the radiation feed to a given external surface will be through a dielectric of a kind which needs no matching (e.g., distrene feed to a distrene prism) or from the air, which requires matching.

Where apparatus is constructed without matching, quarter wave matching plates, of standard form and made of the same material (i.e., same dielectric constant material) as the prisms of the apparatus, can then be applied at will to those surfaces which require matching. One form of surface matching plate comprises a distrene plate of any convenient thickness for ease of handling with quarter wavelength slots cut on one of its surfaces. The other surface mates with the surface to be matched and will generally be a plane surface.

A waveguide bench arrangement will now be described partly to show the advantages to be obtained by the use of the matching plates referred to above.

Figure 14:
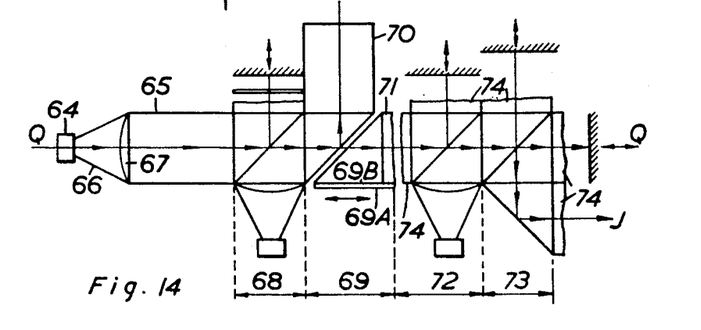
FIG. 14 shows a waveguide bench.

In FIG. 14 a waveguide bench is assembled on a main axis QQ. An oscillator 64 feeds into a fixed attenuator 65 of the lossy dielectric type. The feed is via a horn 66 and a phase correcting lens 67. The phase-correcting lens 67 is matched by means of a quarter wavelength layer on its external surface indicated schematically by an undulating line.

The fixed attenuator 65 is followed successively by a wavemeter 68 of the type described above (FIG. 6) and a variable attenuator 69 also as previously described. The attenuator 69 includes a matched load 70 and the movable external surface, which moves as the attenuation is adjusted, is matched with a quarter wavelength matching plate 71. The matched surface, of the matching plate 71, is again indicated by means of an undulating line. A matched load 69A is attached at the external surface 69B of the attenuator in order to suppress any radiation which may leak through to that surface.

A standing wave detector 72 of the type described above (FIG. 7) is next in turn along the axis QQ and is followed by a transmission matching unit 73 (as FIG. 9). Their external surfaces are matched with quarter wave matching plates 74.

The main path of the radiation energy is along the axis QQ from the oscillator 64 to the matching unit 73 where it turns through a right angle and back again to emerge parallel to the axis QQ at J. The functioning of the apparatus is unaffected by its assembly into a bench. The apparatus may, if desired, be arranged in any other convenient order. The advantages of the use of the quarter wavelength matching plates are then evident although for efficiency the bench is generally assembled in an order which reduces to a minimum the number of quarter wavelength plates, such as 71 and its opposing plate 74, in the path of the main radiation along the axis QQ.

The mounting for the bench can be any convenient mounting which enables the individual items to be selectively assembled along the axis QQ.

I claim:

1. A transmit-receive device for operation at quasi-optical frequencies comprising a local oscillator, a first hybrid unit including a pair of dielectric prisms oriented to provide a pair of adjacent parallel surfaces, each of which would be totally internally reflecting in the absence of the other for radiation incident thereon at an angle greater than the critical angle, said surface being so spaced as to divide incident radiation derived from the local oscillator equally between a straight through transmitted beam and an internally reflected beam, a second hybrid unit of the same construction as said first unit arranged to divide one of said beams into two additional beams each feeding a balanced signal mixer, a third such hybrid unit adapted to divide the second of the aforesaid two equal beams from the local oscillator into two additional beams each being fed into a balanced automatic frequency control mixer, said second hybrid unit being also arranged to accept an incoming received signal and to divide the same into two equal components each feeding one of said balanced signal mixers, said third hybrid unit being positioned to receive a small fraction of the output of a local transmitter as a reference frequency and to divide the same into two equal components fed respectively into the aforesaid two balanced automatic frequency control mixers, and means connecting said frequency control mixers to said local oscillator for controlling the frequency thereof.

2. A transmit-receive device as defined in claim 1 which includes a further pair of prisms cooperatively related with said first, second and third hybrid units and positioned relative thereto to form a square, the surfaces of said further pair adjacent to hybrid units two and three being oriented to pass radiation incident thereon straight through and a diagonal thereof being formed by back-to-back contacting surfaces of the prisms thereof forming totally reflecting surfaces thereby preventing all transmissions across the diagonal.

3. An electro-magnetic device constituting a balanced signal mixer comprising a local oscillator; a first hybrid unit including a pair of dielectric prisms oriented to provide a pair of adjacent parallel surfaces each of which would be totally internally reflecting in the absence of the other for radiation incident thereon at an angle greater than the critical angle, and surfaces so spaced as to divide said incident radiation equally between a straight-through transmitted beam and an internally reflected beam; means for feeding the output of said local oscillator to said first hybrid unit; a second hybrid unit of similar construction as said first unit positioned in cooperative relationship thereto and adapted to divide the internally reflected beam from said first hybrid unit into a straight-through beam and an internally reflected beam; a first signal mixer, means for feeding the internally reflected beam from said second hybrid unit to said first mixer; a further prism unit adjacent to said second hybrid unit formed by a back-to-back contacting of a pair of prisms to form a totally reflecting diagonal surface, said surface totally reflecting a straight-through beam received from said second prism unit; a second signal mixer; a source of signal input to said second hybrid unit wherein said signal is divided into an internally reflected beam directed into said first mixer, and a straight-through beam which is reflected by the diagonal surface of said further prism unit into said second signal mixer.

4. A transmit-receive switch for operation at quasi-optical frequencies comprising a first, second, and third hybrid prism unit each including a pair of dielectric prisms oriented to provide a pair of adjacent parallel surfaces each of which would be totally internally reflecting in the absence of the other for radiation incident thereon at an angle greater than the critical angle, said adjacent surfaces so spaced as to divide incident radiation equally between a straight-through beam and an internally reflected beam; a further prism unit formed by a back-to-back contacting of a pair of prisms to form a totally reflecting diagonal surface; a first and second signal mixer; said first, second, third, and further prism units being positioned in a cooperative relationship whereby a signal input incident on said second prism unit is divided into a reflected portion fed into said first signal mixer, and a straight-through portion which after reflection by said further prism unit is fed to said second signal mixer; a fourth prism unit of similar construction to said first, second, and third prism units but differing therefrom in that the spacing between the adjacent surfaces provides for most of the energy incident thereon to be confined to the straight-through beam and only a small amount of energy being reflected; a transmitter; a first and second automatic frequency control mixer; said fourth prism unit being positioned with respect to said third prism unit whereby a small portion of energy derived from said transmitter after reflection by said fourth prism unit is fed to said first automatic frequency control mixer, and by said further prism unit into said second automatic frequency control mixer; a local oscillator, means for feeding an energy beam from said oscillator to said first prism unit wherein the reflected portion is directed by said second prism unit and said further prism unit into said first and second mixers respectively, and said straight through portion is directed by said third prism unit and said further prism unit into said first and second automatic frequency control mixers respectively; and means connecting the outputs of said frequency control mixers to said local oscillator for controlling the frequency thereof.

References Cited in the file of this patent

UNITED STATES PATENTS

| | | |
|---|---|---|
| 2,032,588 | Miller | Mar. 3, 1936 |
| 2,106,752 | Land | Feb. 1, 1938 |
| 2,187,908 | McCreary | Jan. 23, 1950 |